United States Patent [19]

Kemp et al.

[11] Patent Number: 4,826,423

[45] Date of Patent: May 2, 1989

[54] CONSTRUCTION OF THERMOPLASTIC TUBES WITH TUBULAR RIBS BY HELICAL WINDING UPON A MANDREL

[75] Inventors: Eric E. Kemp, Alpharetta, Ga.; James H. Miller, Reno, Nev.; Leonard F. Sansone, Andover, N.J.

[73] Assignee: Chevron Research Company, San Francisco, Calif.

[21] Appl. No.: 87,177

[22] Filed: Aug. 19, 1987

[51] Int. Cl.⁴ .................. B29C 47/06; B29C 53/62
[52] U.S. Cl. .................................... 425/505; 156/173; 156/244.13; 264/177.14; 264/209.2; 425/325; 425/377; 425/380; 425/393; 425/466
[58] Field of Search .............. 425/505, 224, 377, 380, 425/381, 382 R, 466, 325, 402, 391–393, 204; 264/209.2, 173, 177.14, 177.16, 177.17; 428/36; 156/429, 431, 173, 187, 244.12, 244.13, 244.24

[56] References Cited

U.S. PATENT DOCUMENTS

| | | | |
|---|---|---|---|
| 3,558,411 | 1/1971 | Beelien | 156/244.13 X |
| 3,765,809 | 10/1973 | Farrell | 425/505 |
| 3,890,181 | 6/1975 | Stent et al. | 156/244.13 X |
| 3,910,808 | 10/1975 | Steward | 156/429 |
| 4,436,568 | 3/1984 | Rasmussen | 156/244.13 X |
| 4,466,854 | 8/1984 | Hawerkamp | 156/244.12 X |
| 4,510,004 | 4/1985 | Hawerkamp | 156/244.12 X |
| 4,540,537 | 9/1985 | Kamp | 425/466 X |
| 4,613,389 | 9/1986 | Tanaka | 156/244.13 X |
| 4,643,661 | 2/1987 | Chszaniecke | 425/204 |
| 4,659,303 | 4/1987 | Straka et al. | 425/466 X |

*Primary Examiner*—Richard L. Chiesa
*Attorney, Agent, or Firm*—S. R. La Paglia

[57] ABSTRACT

An apparatus for the production of reinforced tubes by helical winding of thermoplastic strips and reinforcing members on a rotating mandrel, comprises a dual orifice extrusion die means capable of extruding a plastic strip in several different widths while simultaneously feeding a reinforcing member to the rotating mandrel.

4 Claims, 4 Drawing Sheets

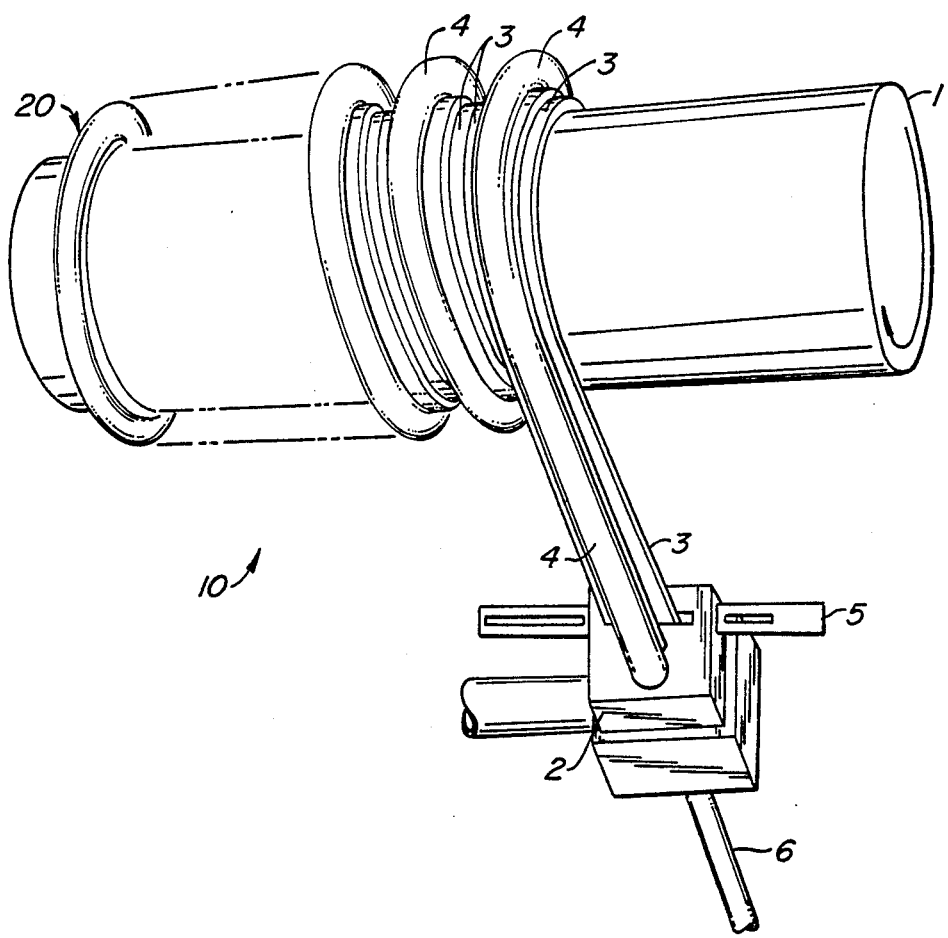
FIG._1.

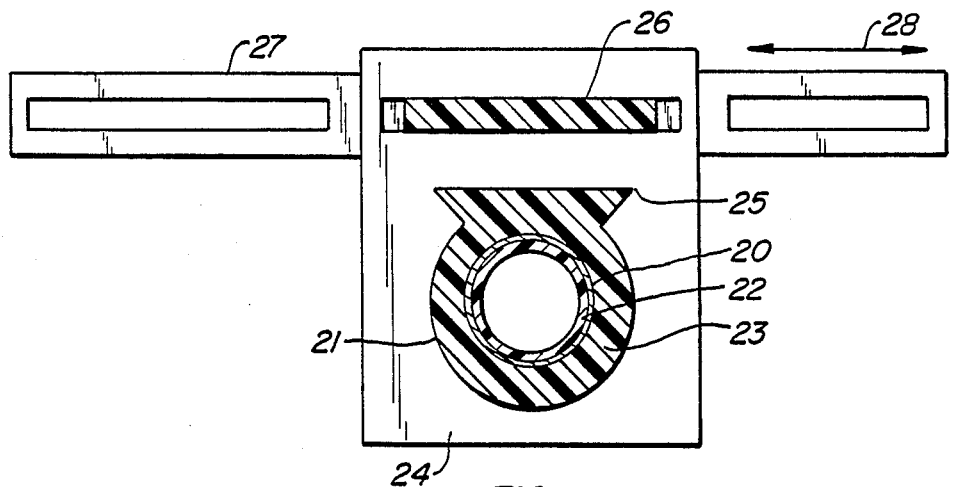
FIG._2.
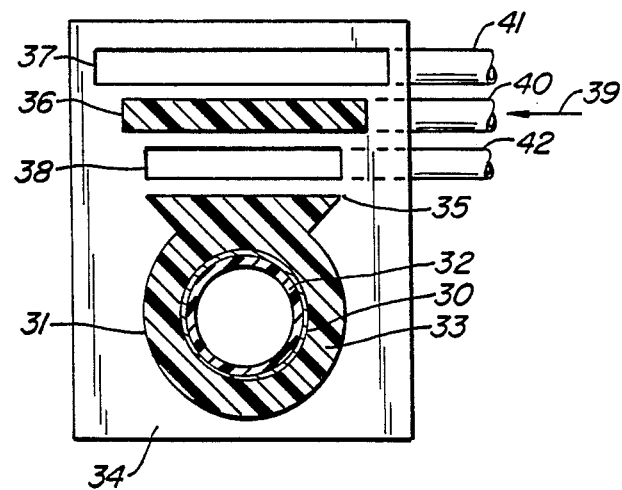
FIG._3.
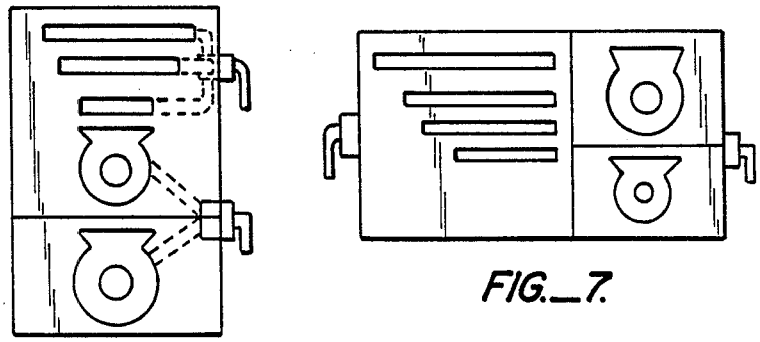
FIG._6.  FIG._7.

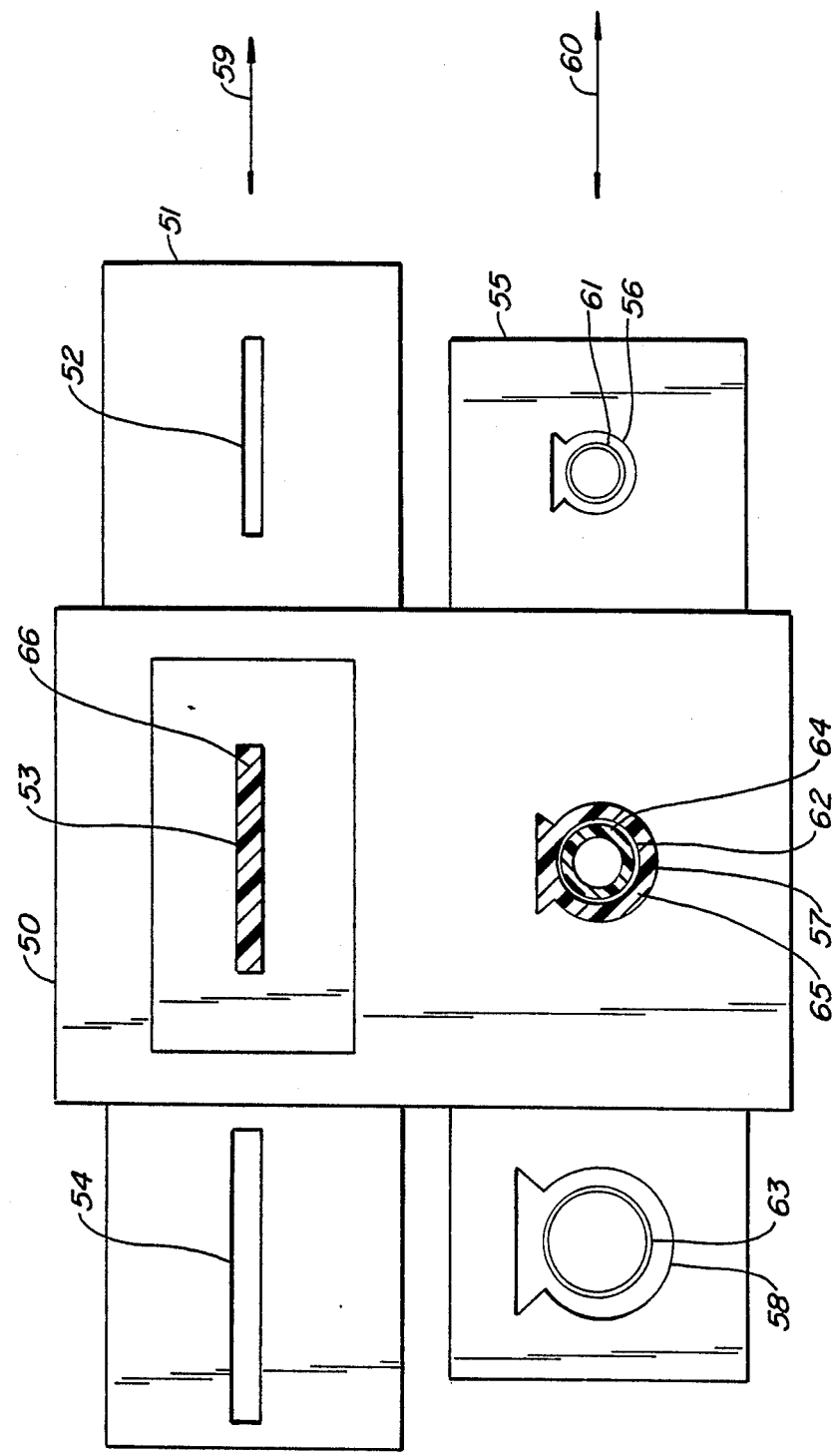
FIG._4.

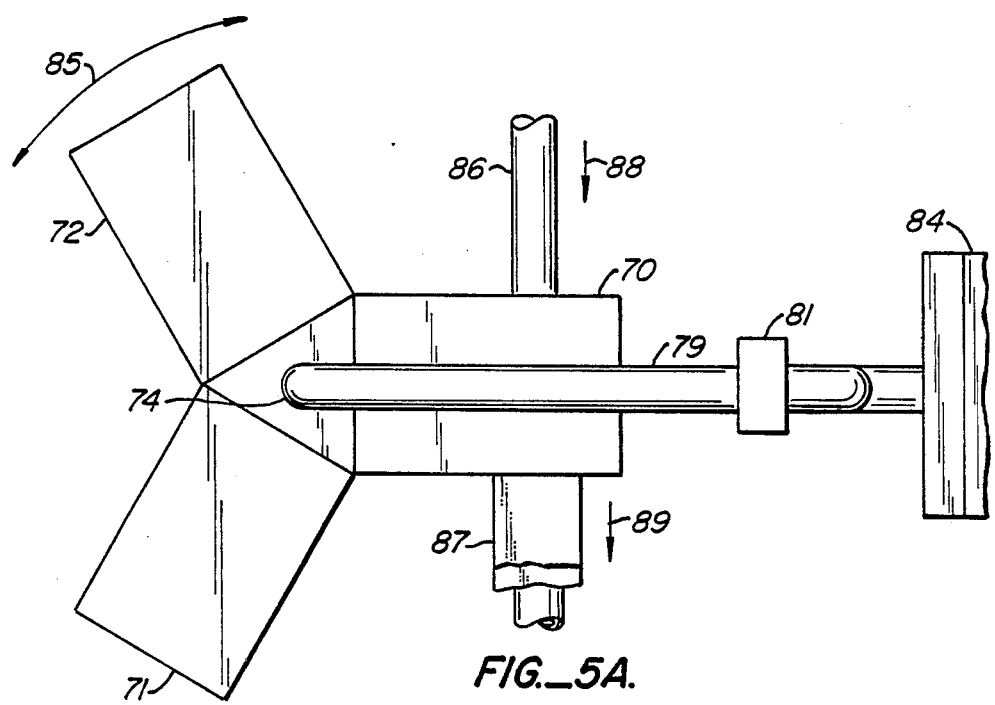
FIG._5A.
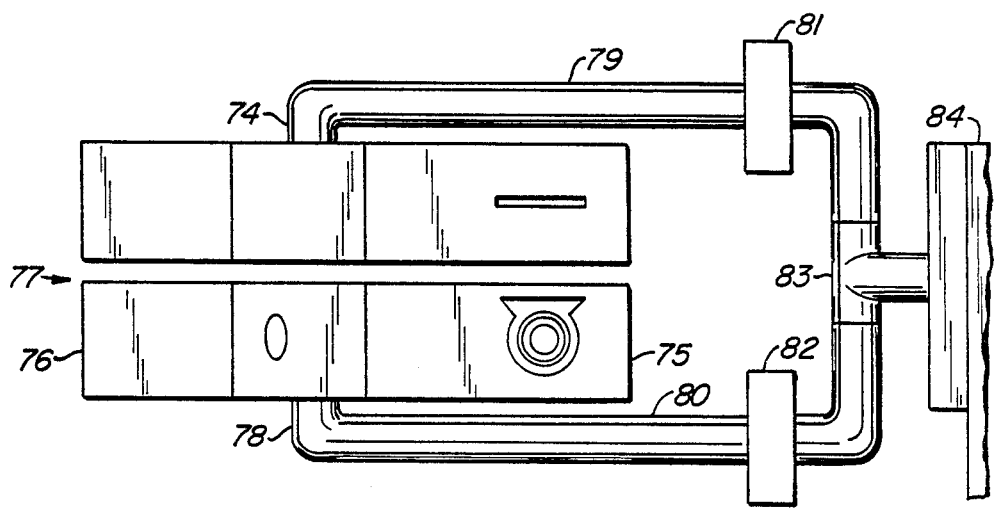
FIG._5B.

CONSTRUCTION OF THERMOPLASTIC TUBES WITH TUBULAR RIBS BY HELICAL WINDING UPON A MANDREL

FIELD AND BACKGROUND OF THE INVENTION

This invention relates to extruding devices and in particular to a new and useful apparatus for producing a helically wound thermoplastic tube. This invention relates to a device for the production of a pipe, a tube, a container having a cylindrical portion, or any partially cylindrical object (hereinafter referred to simply as "a tube") by the helical winding of a thermoplastic material having a profiled cross-section. This invention particularly relates to a method of production of such a tube in a single helical winding.

In prior art methods, a heated thermoplastic strip in the molten state is first helically wound on a heated rotating mandrel to produce a smooth tube by the welding together (fusion) of the abutting or overlapping edges of the molten thermoplastic strip in adjacent turns. This process, in itself, would produce a smooth cylindrical tube with a smooth interior surface upon removal from the mandrel. However, the tube would lack sufficient strength and rigidity for many uses when the tube diameter exceeds a few inches. It is known in the art that the tube can be reinforced with a tubular reinforcing member, or tubular rib, (preferably a thermoplastic material supported on a hose, more preferably a hose with a corrugated wall, and most preferably a corrugated polypropylene hose). The tubular reinforcing member is welded in the same or different helical period to the thermoplastic strip of the cylindrical tube. Such tubular ribs lend a characteristic cross-sectional profile to the finished tube, and are sometimes referred to as "profile sections".

The prior art has suggested that the thermoplastic strip and the tubular rib be simultaneously extruded *as a single extrudate* resembling a flanged tube and pressed upon the mandrel to form the cylindrical tube by welding adjacent flanges. In this vein, U.S. Pat. Nos. 4,466,854 and 4,510,004, the disclosures of which are herein incorporated by reference, disclose devices for the production of a tube by helical winding of thermoplastic extrudates having certain profile sections onto a mandrel. The prior art devices include a calibrated sliding profiled pressure member, or template, of a width at least corresponding to the width of the thermoplastic extrudate. The slide welds together the abutting or overlapping edges of the extrudate wound upon the mandrel. The slide is displaced along with the extruder in the axial direction of the rotating power-driven mandrel. The extrusion head provides a single continuous extruded thermoplastic extrudate of a profile section having two base flanges which form the longitudinal edges for welding, and also includes an outwardly projecting tubular reinforcement between the flanges which forms the tubular rib. The extrusion head is disposed with its longitudinal axis on a tangent to the mandrel corresponding to the pitch of the helix. The calibrated slide is disposed coaxially with the longitudinal axis of the extrusion head, has a guide channel for the outwardly projecting tubular reinforcement, and has internal passages through which a coolant passes to prevent sticking of the hot extrudate to the slide. It is of decisive significance according to the cited art that the extrudate be a single thermoplastic profile section, namely, having two base flanges for forming the longitudinal edges and an outwardly projecting longitudinal reinforcement between them. It is also of decisive importance in the cited art to advance the plastic extrudate between the extrusion head of the extruder and the calibrating slide along an exactly straight line with no sagging. This is accomplished by driving the mandrel at a peripheral speed somewhat greater than the extrusion speed and thus drawing the profile section through the calibrating slide. Purportedly, this is the only direct means of insuring that the physical and technical properties of the tube will remain within very tight tolerances.

U.S. Pat. No. 4,510,004 also provides a method for producing a reinforced tube of hollow profile section in which the plastic is deposited onto a rotating mandrel and at the same time a profiling material, such as a hose, is directed onto the plastic material and combined therewith without substantial tension. In this prior art method, there is purportedly no risk of deforming the tube. The extrudate is wound onto a mandrel, together with a profiling material paid out from a material feeder. The thermoplastic extrudate is fed from the nozzle of an extruder in a deformable state and onto the mandrel to produce an obliquely wound assembly welded at the joints between successive turns. The extruder nozzle is preceded by a feeder which draws the supporting profiling material from a source, such as a bobbin, and urges it into a nozzle. The method utilizes traction rollers providing at least one feeding channel for the profiling material or supporting hose and at least one of the traction rollers is power-driven.

While the prior art describes successful methods for the production of spirally wound thermoplastic tubes, the devices are cumbersome and ill-adapted for flexible production of tubes of various diameters and rigidity. It would be advantageous if tubes of different helical period and different profiles could be made from the same extruder means by changing the periodicity of a thermoplastic winding in a single-pass winding operation. This is not possible in the single-pass winding operations of the prior art without changing the extruder head means to provide thermoplastic extrudates of different width.

SUMMARY OF THE INVENTION

In an apparatus for producing a tube by helical winding, the present invention provides a dual orifice extrusion die means and a method for its use in the manufacture of tubes whereby a thermoplastic strip and a tubular reinforcing member (i.e., a tubular rib) are separately, simultaneously and continuously extruded. The apparatus offers the advantage of adjusting the width of the extruded thermoplastic strip while simultaneously changing the periodicity of the helical winding, thereby, tubes of a variety of profiles are produced from the same device by minor adjustments of the apparatus.

BRIEF DESCRIPTION OF THE DRAWINGS

The invention will be further illustrated by reference to the accompanying drawings which illustrate a specific embodiment of the invention.

FIG. 1 shows an apparatus for producing a tube by helical winding of a thermoplastic strip on a rotating mandrel, while simultaneously extruding and winding a tubular rib of the same helical periodicity.

FIG. 2 shows a frontal view of the dual orifice extrusion die means and the adjustable die means for extrusion of thermoplastic strips of various widths.

FIGS. 3 and 4 show in frontal view other embodiments of the dual orifice extrusion die means. FIGS. 5A and 5B respectively depict plan and elevation view of another embodiment of the dual orifice extrusion die means of the present invention.

FIGS. 6 and 7 show in frontal view other embodiments of the dual orifice extrusion die means.

DESCRIPTION OF PREFERRED EMBODIMENTS

Referring to the drawings, FIG. 1 generally designates an embodiment of the apparatus of the invention by the numeral 10, and includes a heated rotating mandrel 1 around which the tube 20 is formed by helical winding, a dual orifice extrusion die means 2 fed by a screw extruder, and a means (not shown) for controlling the relative longitudinal motion of said dual orifice extrusion die means with respect to said mandrel. An embodiment of such means for controlling the relative longitudinal motion of the dual orifice extrusion die means and mandrel is achieved by mounting the dual orifice extrusion die means on a carriage which moves on tracks of longitudinal extension parallel to the longitudinally fixed mandrel which rotates on its axis as shown in FIG. 1.

In FIG. 1 an embodiment of a dual orifice extrusion die means 2 in the combination of this invention is shown directing and continuously extruding a plastic strip 3 to said rotating mandrel 1 in overlapping or abutting relationship between the edges of adjacent turns of said plastic strip 3 around said mandrel 1. Heat bonding of the edges of the plastic strip are thus achieved under the heated temperature conditions of the mandrel 1, which is heated by means not shown.

The dual orifice extrusion die means 2 is shown continuously feeding a tubular reinforcing member 4, (i.e., a tubular rib), to said rotating mandrel 1 in the same helical period (or pitch angle) as said plastic strip. The tubular rib comprises, in general, a supporting hose 6 made of reinforcing material surrounded by thermoplastic extrudate of the same nature as that of said thermoplastic strip 3, but not necessarily of the same nature.

The dual orifice extrusion die means 2 comprises a strip die means 5 for said plastic strip, which strip die means is adjustable for effecting the extrusion of said plastic strip in different widths (as hereinafter described in FIG. 2).

During the depositing of the strip 3 and reinforcing member 4 on the mandrel 1, the mandrel is rotated, and the dual orifice extrusion die means, mounted on a moveable carriage (not shown) moves parallel to the longitudinal axis of the mandrel. The dual orifice extrusion die means is disposed with its longitudinal axis on a tangent to the mandrel corresponding to the pitch, or period, of the helix.

FIG. 2 depicts the frontal view of the dual orifice extrusion die means 2, showing in cross-section a hollow internal mandrel 20, and the tubular rib 21, comprised of a supporting hose 22 and thermoplastic extrudate 23. The thermoplastic extrudate 23 is extruded via feed lines (not shown) through dual orifice extrusion die means 24 providing a flanged shape 25 to said tubular rib adapted for secure union to the co-extruded thermoplastic strip 26. The thermoplastic extrudate 26 is extruded via feed lines (not shown) in the form of a strip by strip die means 27. The strip die means 27 is adjustable by lateral movement as shown by the double arrow 28 to provide thermoplastic strips in several widths as shown.

FIG. 3 depicts the frontal view of another embodiment of the dual orifice extrusion die means of the present invention, showing in cross-section a hollow internal mandrel 30, and the tubular rib 31, comprised of a supporting hose 32 and thermoplastic extrudate 33. The plastic extrudate 33 is extruded via feed lines (not shown) through dual orifice extrusion die means 34 providing a flanged shape 35 to said tubular rib adapted for secure union to the co-extruded thermoplastic strip 36. The width of the thermoplastic strip is varied by use of alternate narrower strip die means orifice 38 or wider strip die means orifice 37. The thermoplastic strip material shown in FIG. 3 is supplied through feed line 40 in the direction of arrow 39. By valve means (not shown) the thermoplastic material is alternatively supplied through feed lines 41 or 42.

FIG. 4 depicts the frontal view of another embodiment of the dual orifice extrusion die means of the present invention, showing a dual orifice extrusion die means 50 housing sliding member 51 providing alternate strip die orifices 52, 53 and 54 and sliding member 55 providing alternate crosshead die orifices 56, 57 and 58 for various sizes of tubular reinforcing members. Members 51 and 55 are adjustable by lateral movement as shown by the double arrows 59 and 60, respectively. When strip die 53 is moved to center position of dual orifice extrusion die means 50, an inlet port (not shown) is aligned with a supply port (not shown) in the die means 50 allowing flow of molten thermoplastic material 66 through strip die orifice 53. In a similar manner, when crosshead die orifice 57 is moved to center position of die means 50, an inlet port (not shown) is aligned with a supply port (not shown) in die means 50 allowing flow of molten thermoplastic material 65 through the crosshead die orifice 57. Each of the crosshead die orifices 56, 57 and 58 are provided with hollow internal mandrels 61, 62 and 63 respectively, which allows the support hose 64 to be passed through the crosshead die to the inside of the tubular reinforcing extrudate 65. Upon being drawn by the rotating mandrel 1, the size of the tubular reinforcing extrudate 65 is diminished until its internal diameter touches the outer diameter of the support hose 64.

The supply ports for the strip die orifice and the crosshead die orifice are fed by a thermoplastic extruder, not shown, pumping through a tee fitting dividing the flow stream into two flow paths. The proper amount of flow in each melt stream may be controlled in relation to the relative finished cross sections of the strip extrudate and tubular reinforcing extrudate by means of two throttling valves or two thermoplastic melt gear pumps independently driven or two close-intermeshing, counter-rotating, twin-screw thermoplastic melt pumps independently driven (not shown).

FIGS. 5A and 5B depict respectively plan and elevation views of another embodiment of the dual orifice extrusion die means of the present invention. The embodiment of FIG. 5 utilizes many of the features of the embodiment of FIG. 4 except that the strip dies 70, 71 and 72 are arranged radially around an upper central hollow shaft 74 serving as a feed pipe and having a supply port which aligns with an inlet port on strip die 70 so as to provide flow to the strip die orifice. Similarly, crosshead dies 75, 76 and 77 (obscured by die 76)

are arranged radially around a lower central hollow shaft 78 serving as a feed pipe and having a supply port which aligns with an inlet port on crosshead die 75 so as to provide flow to the die orifice. Strip dies 71 and 72 and crosshead dies 76 and 77 are placed in operating position by rotation of the assemblies around hollow shafts 74 and 78 respectively and rotatable as shown by the double headed arrow 85. Shown are the support hose for the tubular rib 86 entering the rear of the crosshead die 75 in the direction shown by arrow 88 and the thermoplastic strip 87 emerging from the strip die orifice in the direction shown by arrow 89. Also shown are distribution pipes 79 and 80, flow control devices 81 and 82 which may be throttling valves, thermoplastic melt gear pumps or close-intermeshing, counter-rotating, twin-screw thermoplastic melt pumps, a distribution tee 83 and a thermoplastic screw extruder 84.

FIGS. 6 and 7 show dual orifice extrusion die means of the present invention having configurations which differ slightly from that of FIG. 3 and which provide a selection of two crosshead die orifices for extrusion of the tubular rib.

By the term "thermoplastic" it is intended to mean any organic polymer, natural or synthetic, which in its final state is capable of being repeatedly softened by increase of temperature and hardened by decrease of temperature. Examples of especially preferred organic thermoplastic polymers are olefinic polymers, such as polyethylene, and copolymers, such as ethylene-butylene copolymers, ethylene-hexene copolymers and the like. By "reinforcing material" is intended to mean any material of sufficient rigidity and strength to provide support for the thermoplastic. Such a reinforcing material could be, and preferably is, itself a plastic material of higher melting point than said thermoplastic. Numerous examples of such thermoplastic and reinforcing materials are known in the prior art and would be matters of choice to workers of ordinary skill in this art. High density polyethylene is a particularly preferred thermoplastic material.

While specific embodiments of the invention have been shown and described in detail to illustrate the application of the principles of the invention, it will be understood that the invention finds other embodiments without departing from these principles.

What is claimed is:

1. In an apparatus for producing a tube by helical winding, the combination comprising:
   a rotating mandrel around which said tube is formed by helical winding;
   a dual orifice extrusion die means,
   a. which is capable of directing and continuously extruding a thermoplastic strip to said rotating mandrel in overlapping or abutting relationship between the edges of adjacent turns of said thermoplastic strip around said mandrel,
   b. which is capable of continuously feeding a tubular rib to said rotating mandrel in the same helical period as said thermoplastic strip,
   c. comprising a strip due means for said thermoplastic strip which is capable of effecting extrusion of said thermoplastic strip in several different widths by means of a multiplicity of fixed strip die orifices of different sizes,
   d. comprising a tubular rib die means capable of extruding said tubular rib in one or more sizes by means of a multiplicity of fixed crosshead die orifices of different sizes, and
   e. the flow of thermoplastic material is diverted to one crosshead die orifice and to one strip die orifice by valve means; and
   means for controlling the relative longitudinal motion of said dual orifice extrusion die means with respect to said mandrel.

2. In an apparatus for producing a tube by helical winding, the combination comprising:
   a rotating mandrel around which said tube is formed by helical winding;
   a dual orifice extrusion die means,
   a. which is capable of directing and continuously extruding a thermoplastic strip to said rotating mandrel in overlapping or abutting relationship between the edges of adjacent turns of said thermoplastic strip around said mandrel,
   b. which is capable of continuously feeding a tubular rib to said rotating mandrel in the same helical period as said thermoplastic strip,
   c. comprising a strip die means for said thermoplastic strip which is capable of effecting extrusion of said thermoplastic strip in several different widths by means of several movably interchangeable strip die orifices of different width and/or height to accommodate the manufacture of tubes of different helical periods and/or strip layer thickness,
   d. comprising a tubular rib die means capable of extruding said tubular rib in one or more sizes by means of several movably interchangeable crosshead die orifices of different size to accommodate various supporting hose diameters, and
   e. said rib and strip die means are connected to separate thermoplastic supply ports; and
   means for controlling the relative longitudinal motion of said dual orifice extrusion die means with respect to said mandrel.

3. An apparatus as in claim 2 wherein said interchangeable orifices are arranged in a linear fashion, and means are provided to align one of said crosshead die orifices with a first supply port and to align one of said strip die orifices with a second supply port to readily produce various combinations of tubular rib diameter, tubular rib helical period, and strip thickness and width.

4. An apparatus as in claim 2 wherein said interchangeable crosshead die orifices are arranged radially around a center supply port and are designed so that the inlet port for the crosshead die orifice aligns with a supply port when it is rotated to the proper operating position, and said strip die orifices are arranged radially around a second supply port and designed so that the inlet port for a strip die orifice aligns with the second supply port when it is rotated to the proper operation position.

* * * * *